US009828223B2

(12) United States Patent
Svensson et al.

(10) Patent No.: US 9,828,223 B2
(45) Date of Patent: Nov. 28, 2017

(54) FORK-LIFT TRUCK AND METHOD FOR OPERATING A FORK-LIFT TRUCK

(71) Applicant: BT Products AB, Mjöby (SE)

(72) Inventors: Rune Svensson, Mantorp (SE); Magnus Persson, Sturefors (SE); Håkan Frid, Mjölby (SE)

(73) Assignee: BT Products AB, Mjölby (SE)

( * ) Notice: Subject to any disclaimer, the term of this patent is extended or adjusted under 35 U.S.C. 154(b) by 0 days.

(21) Appl. No.: 14/861,349

(22) Filed: Sep. 22, 2015

(65) Prior Publication Data
US 2016/0090284 A1    Mar. 31, 2016

(30) Foreign Application Priority Data

Sep. 25, 2014 (EP) .................................. 14186472

(51) Int. Cl.
| | | |
|---|---|---|
| *G06F 7/70* | (2006.01) | |
| *G06F 19/00* | (2011.01) | |
| *G06G 7/00* | (2006.01) | |
| *G06G 7/76* | (2006.01) | |
| *B66F 9/075* | (2006.01) | |
| *B66F 9/24* | (2006.01) | |
| *G05D 1/02* | (2006.01) | |

(Continued)

(52) U.S. Cl.
CPC .............. *B66F 9/0755* (2013.01); *B66F 9/07* (2013.01); *B66F 9/24* (2013.01); *G05D 1/0225* (2013.01); *G05D 1/0246* (2013.01); *H04N 13/0203* (2013.01); *G05D 2201/0216* (2013.01); *G06T 2200/04* (2013.01); *G06T 2207/10012* (2013.01); *G06T 2207/30252* (2013.01)

(58) Field of Classification Search
CPC ................................ B66F 9/07; B66F 9/0755
See application file for complete search history.

(56) References Cited

U.S. PATENT DOCUMENTS

| | | | | |
|---|---|---|---|---|
| 2007/0177011 | A1* | 8/2007 | Lewin | B62D 15/0285 348/118 |
| 2007/0229238 | A1* | 10/2007 | Boyles | G06K 9/00369 340/435 |

FOREIGN PATENT DOCUMENTS

| | | |
|---|---|---|
| EP | 2345620 A1 | 7/2011 |
| EP | 2385435 A1 | 11/2011 |
| EP | 2468678 A1 | 6/2012 |

OTHER PUBLICATIONS

European Search Report for EP Appl'n No. 14186472.8, Mar. 5, 2015.

\* cited by examiner

*Primary Examiner* — Imran Mustafa
(74) *Attorney, Agent, or Firm* — Quarles & Brady LLP

(57) ABSTRACT

A fork-lift truck includes a load carrier, a first optical detector, an optical analyzing unit, and a second optical detector. The analyzing unit receives and analyses information from the second optical detector, wherein the first and second optical detector are movable together with the load carrier, and the first optical detector is positioned in relation to the load carrier, such that a first field of view includes at least a part of the load carrier and an extension of the load carrier. The second optical detector is positioned, such that a second field of view includes a predetermined volume above the load carrier The position and orientation of the second detector is calibrated in relation to a predetermined position on the fork-lift truck, in case one or more objects are positioned in the predetermined volume, at least one three-dimensional relative position can be determined.

10 Claims, 6 Drawing Sheets

(51) Int. Cl.
*B66F 9/07* (2006.01)
*H04N 13/02* (2006.01)

FORK-LIFT TRUCK AND METHOD FOR OPERATING A FORK-LIFT TRUCK

CROSS-REFERENCE TO RELATED APPLICATIONS

The present application claims the benefit of European Patent Application No. 14186472.8 filed Sep. 25, 2014, which is fully incorporated herein by reference.

STATEMENT REGARDING FEDERALLY SPONSORED RESEARCH OR DEVELOPMENT

Not applicable.

FIELD OF THE INVENTION

The present invention relates to a fork-lift truck, a method of operating a fork-lift truck, and a computer program product.

BACKGROUND OF THE INVENTION

From a US 2004/0073359 it is known to use a camera for picking up an image of a cargo handling target and acquire an image data of a mark affixed to the cargo handling target. The discussed fork-lift of this document uses cargo handling targets for position control.

SUMMARY OF THE INVENTION

The prior art discusses the usage of cargo handling targets in order to achieve positioning when approaching a cargo. However the prior art does not discuss how to avoid bad position control. For example the prior art fork-lift truck cannot position itself if a cargo handling target is missing. The prior art is also dependent of that the cargo handling target is positioned at a predetermined position. Therefore it is an object of the present disclosure to disclose a more flexible and advantageous solution that can provide at least a partial solution to the inconveniences with the prior art.

According to an aspect of the present disclosure the object is achieved by a fork-lift truck comprising a load carrier, a first optical detector having a first field of view, at least one optical analysing unit arranged to receive and to analyse information from the first optical detector, a second optical detector having a second field of view, wherein the at least one optical analysing unit is arranged to receive and to analyse information from the second optical detector, wherein the first and second optical detector are movable together with the load carrier, wherein the first optical detector is positioned at a first position in relation to the load carrier, such that the first field of view, if the load carrier is empty, includes at least a part of the load carrier and an extension of the load carrier so one or more potential objects positioned within a predetermined distance from the load carrier in the direction of the extension of the load carrier can be detected, wherein the second optical detector is positioned at a second position, such that the second field of view includes, if the load carrier is loaded, a predetermined volume above the load so that potential objects positioned within the predetermined volume can be detected, and wherein the position and orientation of the second detector is calibrated in relation to a predetermined position on the fork-lift truck, such that, in case one or more objects are positioned in the predetermined volume, at least one three-dimensional relative position can be determined by the at least one optical analysing unit between, on one side, the load and/or load carrier, and, on the other side, the one or more objects positioned in the predetermined volume.

The advantage of such a fork-lift truck is that objects close to the load carrier can be detected which are potentially dangerous when operating the load carrier. This is achieved by the two optical detectors. Once the objects are detected the fork-lift truck will be able to determine how the objects are positioned in relation to the fork-lift truck and whether they are hindering the truck to perform operations in a planned way, especially when it relates to operations of the load carrier. Thus, the truck will be able to prevent dangerous situations. Therefore safety will be increased when operating such a truck. Such a truck will also be better to perform manoeuvres in relation to the surrounding. It will further be easier to automatically operate such a truck. Therefore, manual interventions in the operation of a truck might be reduced. Also, the risk of the truck hitting other objects in the surrounding by mistake will be reduced. In addition to improved safety this also reduces damages.

One advantage with this solution is that automatic pallet handling can be facilitated. Another advantage with this solution is that the time and/or instances needed for manual interception in automated processes can be minimized. Yet, another advantage with this solution is that it is flexible and can be adopted to different situations. Further, at least small deficiencies between expected positions of objects, like cargos and rackings in a warehouse, and real positions of these objects can be corrected.

According to an aspect of the present disclosure the second optical detector is positioned at a predetermined position and/or with a predetermined orientation in relation to the load carrier. This provides a preferred way of achieving the calibration of the second optical detector.

According to an aspect of the present disclosure the position of the second optical detector is defined by coordinates in three dimensions and the orientation of the second optical detector is defined by at least one angle of orientation in relation to the predetermined position on the fork-lift truck. Also this provides a preferred way of achieving the calibration of the second optical detector.

According to an aspect of the present disclosure the first and the second optical detector comprise a 3D-camera, preferably a 3D-camera working on the time-of-flight principle. This allows for an easy and reliable embodiment for the two optical detectors. 3D-cameras working on the time-of-flight (TOF) principle allow for receiving three-dimensional (3D) information of the surrounding without the need of stereo-matching or the like. Thus manual input to receive 3D information is minimised. Further, computational power needed to achieve 3D information will be low in comparison.

According to an aspect of the present disclosure the one or more objects positioned in the predetermined volume comprise at least one of racking, load on a racking, and pallet, and/or the one or more potential object positioned within a predetermined distance from the load carrier in the direction of the extension of the load carrier comprise at least one of racking, load on a racking, and pallet.

Information about racking, load on a racking, and/or pallets is usually known in a warehouse since rackings often have standard sizes and usually do not change. Even pallets are often standardises and might be the same all over the warehouse. Even kind and dimensions of loads are often known in a warehouse since they are needed to organise the warehouse. Therefore, these objects can be easily detected since for example templates could be used to identify any of these objects in the field of view of any of the optical detectors.

According to an aspect of the present disclosure the fork-lift truck further comprises a load carrier control unit, wherein the at least one optical analysing unit is arranged to transfer information relating to the determined at least one three-dimensional relative position to the load carrier control unit, wherein the load carrier control unit is arranged to process the transferred information and to adjust at least one of position, orientation and movement of the load carrier based on the transferred information.

This allows for a favourable arrangement of these components on the fork-lift truck. All these elements can be placed at or close to the load carrier, which would minimise the amount of data which has to be transferred from the optical detectors to a potential main control unit (MCU). This minimises potential sources of errors when transmitting data. It also provides for easy replacement of the elements in case some of them might malfunction.

Another advantage is that the adjustment of the load carrier allows for an easy way to potentially react on the detected objects, thus overcoming constraints for truck operation which might be caused by the detected objects.

According to an aspect of the present disclosure the load carrier unit is arranged to perform the adjustment of position and/or movement of said load carrier in at least one, and preferably in three dimensions. This allows for a flexible adjustment of the load carrier.

According to an aspect of the present disclosure at least one of the optical detectors is arranged to detect a pallet of an object within said predetermined distance from the load carrier in the direction of the extension of the load carrier and/or in the predetermined volume, preferably also at least one pallet tunnel of said pallet. This allows for a favourable way of orienting the load carrier in relation to the load, especially the part of the load which potentially should be engaged by the load carrier.

According to an aspect of the present disclosure the predetermined volume comprises a first part located directly above the load and/or a second part located in front of the load. This allows for example for detecting obstacles when lifting a load and/or when depositing a load.

According to an aspect of the present disclosure the at least one optical analysing unit and/or load carrier control unit is comprised within a master control unit of the fork-lift truck. This allows for an alternative embodiment which allows for a simple solution and a reduced amount of hardware needed.

According to an aspect of the present disclosure a method is provided for operating a fork-lift truck comprising a load carrier, a first optical detector, a second optical detector, and at least one optical analysing unit, wherein the second optical detector is calibrated in relation to a position on the fork-lift truck, preferably a position on the load carrier. The method comprises the step of detecting by the first and/or second optical detector at least one object in the longitudinal direction of the load carrier and/or a potential load on the load carrier, and/or at least one object above or below the load carrier and/or a potential load, the step of determining at least one three-dimensional relative position between, on one side, the determined at least one object and, on the other side, the load carrier and/or the potential load, and the step of providing measures to adjust at least one of a position, an orientation and a movement of the load carrier based on the determined three-dimensional relative position.

The advantage of such a method for operating a fork-lift truck is that objects close to the load carrier can be detected which are potentially dangerous when operating the load carrier. Once the objects are detected the fork-lift truck will be able to determine how the objects are positioned in relation to the fork-lift truck and whether they are hindering the truck to perform operations in a planned way, especially when it relates to operations of the load carrier. Thus, the method will be able to prevent dangerous situations. Therefore safety will be increased when operating a truck. The method also allows a truck to better perform manoeuvres in relation to the surrounding. It will further be easier to automatically operate a truck. Therefore, manual interventions in the operation of a truck might be reduced. Also, the risk of the truck hitting other objects in the surrounding by mistake will be reduced. In addition to improved safety this also reduces damages.

According to an aspect of the present disclosure the step of detecting at least one object comprises transferring an output from the first and/or second optical detector to the at least one optical analysing unit, where the at least one optical analysing unit processes the received output to identify said at least one object. This is a preferred implementation of the method since it provides an easy way to identify the at least one object.

According to an aspect of the present disclosure the step of detecting at least one object is performed within a predetermined volume. This reduces computation time and/or data which has to be analysed. Therefore a faster method is provided.

According to an aspect of the present disclosure size and position of the predetermined volume is chosen based on the dimensions of a load on the load carrier in case such a load is present, and/or wherein size and position of said predetermined volume is chosen based on a predetermined pallet size to be handled and/or a height of a load of a predetermined size to be handled in case no load is present on the load carrier. This allows for an optimal choice of the volume based on the given circumstances.

According to an aspect of the present disclosure the method, used when a load is present on the load carrier, further comprises lifting the load carrier with the load on it. In case at least one object is detected above said load by the second optical detector, and that at least one of the detected at least one object protrudes in a lifting path of the load carrier with the load, the method further comprises providing measures to avoid collision between the at least one object and the load carrier with the load. This allows using the method for preventing crashes between, on one side a load and/or load carrier, and, on the other side, obstacles when lifting the load.

According to an aspect of the present disclosure the method, used when no load is present on the load carrier, further comprises lifting the load carrier. In case at least one object is detected above the load carrier by the first optical detector, and that at least one of the detected at least one object protrudes in a lifting path of the load carrier, the method further comprises providing measures to avoid collision between the at least one object and the load carrier. This allows using the method for preventing crashes between the load carrier and obstacles when lifting the load. In one example information regarding the detected objects, for example information regarding position of the detected objects, is stored. This stored information is in one example used in combination with knowledge about the size of a load which is to be picked up after lifting the load carrier to determine whether at least one of the detected objects is protruding in the lowering path when lowering the load carrier with the load. In that case measures are in one example provided to prevent collision between the at least one protruding object and the load carrier and/or the load on the load carrier. This thus also allows using the method for preventing crashes between, on one side, the load carrier and/or the load on the load carrier, and, on the other side, a protruding object when lowering the load carrier.

According to an aspect of the present disclosure the method, used when no load is present on the load carrier and the fork-lift truck is positioned in front of a racking where load should be picked up, further comprises lifting the load carrier to a predetermined position where a load to pick up is expected. The method further comprises determining the load to pick up, preferably potential pallet tunnels of that load, among the detected at least one object. The method further comprises assuring that the determined at least one three-dimensional relative position comprises at least one three-dimensional relative position between the load to pick up and the load carrier, preferably at least one three-dimensional relative position between potential pallet tunnels of the load and the load carrier. The method further comprises providing measures to adjust at least one of a position and an orientation of the load carrier based on the determined three-dimensional relative position, providing these measures in such a way that the load carrier is positioned in a pick-up position in front of the load to pick up, such that a compensation for racking misalignment and/or deflection, floor misalignment, and mast inclination and/or deflection is achieved. The method further comprises loading the load on the load carrier, preferably by entering the load carrier in the pallet tunnels, and picking up the load. This allows using the method for picking up a load.

According to an aspect of the present disclosure the method, used when a load is present on the load carrier and the fork-lift truck is positioned in front of a racking where a load is to be deposited, further comprises lifting the load carrier to a predetermined position, where it is assumed that the second optical detector can detect whether there are any protruding objects in a volume where the load is to be deposited. The method further comprises determining a predetermined object with a predetermined relation to the racking and to the volume where the load is to be deposited among the detected at least one object. The method further comprises assuring that the determined at least one three-dimensional relative position comprises at least one three-dimensional relative position between the load carrier and the predetermined object with the predetermined relation to the racking and to the volume. The method further comprises providing measures to adjust at least one of a position, and an orientation of the load carrier based on the determined three-dimensional relative position, providing these measures in such a way that a compensation for racking misalignment and/or deflection, floor misalignment, and mast inclination and/or deflection is achieved and such that the second optical detector can detect whether there are any protruding objects in the volume where the load is to be deposited. The method further comprises detecting by the second optical detector whether there are any protruding objects in the volume where the load is to be deposited. The method further comprises, in case no protruding objects have been found in the volume where the load is to be deposited, positioning the load carrier in a position where the load can be deposited and depositing the load into the racking.

This allows using the method for depositing a load. According to an aspect of the present disclosure the predetermined object comprises at least one of a side of a racking and a landmark. This is allows for an easy implementation since rackings and/or landmarks often are present in warehouses.

According to an aspect of the present disclosure the method further comprises, after the load has been deposited, retracting the load carrier from the load. The method further comprises, after the load carrier has been retracted by at least a predetermined distance from the load, detecting the load, preferably a potential pallet of the load, and the racking by said first optical detector; and determining a three-dimensional relative position between the load, preferably the potential pallet of the load, and the racking. This increases safety when depositing a load since such an implementation of the method can be used to assure that the load is not stuck on the load carrier.

According to an aspect of the present disclosure a computer program product is provided, that, when executed in an optical analysing unit of a fork-lift truck according to the present disclosure or an optical analysing unit together with a load carrier control unit of a fork lift truck according to the present disclosure, executes a method according to the present disclosure. By doing so the advantages of the truck according to the present disclosure and of the method according to the present disclosure are combined.

DETAILED DESCRIPTION OF THE EXAMPLE EMBODIMENTS

Figure 1:
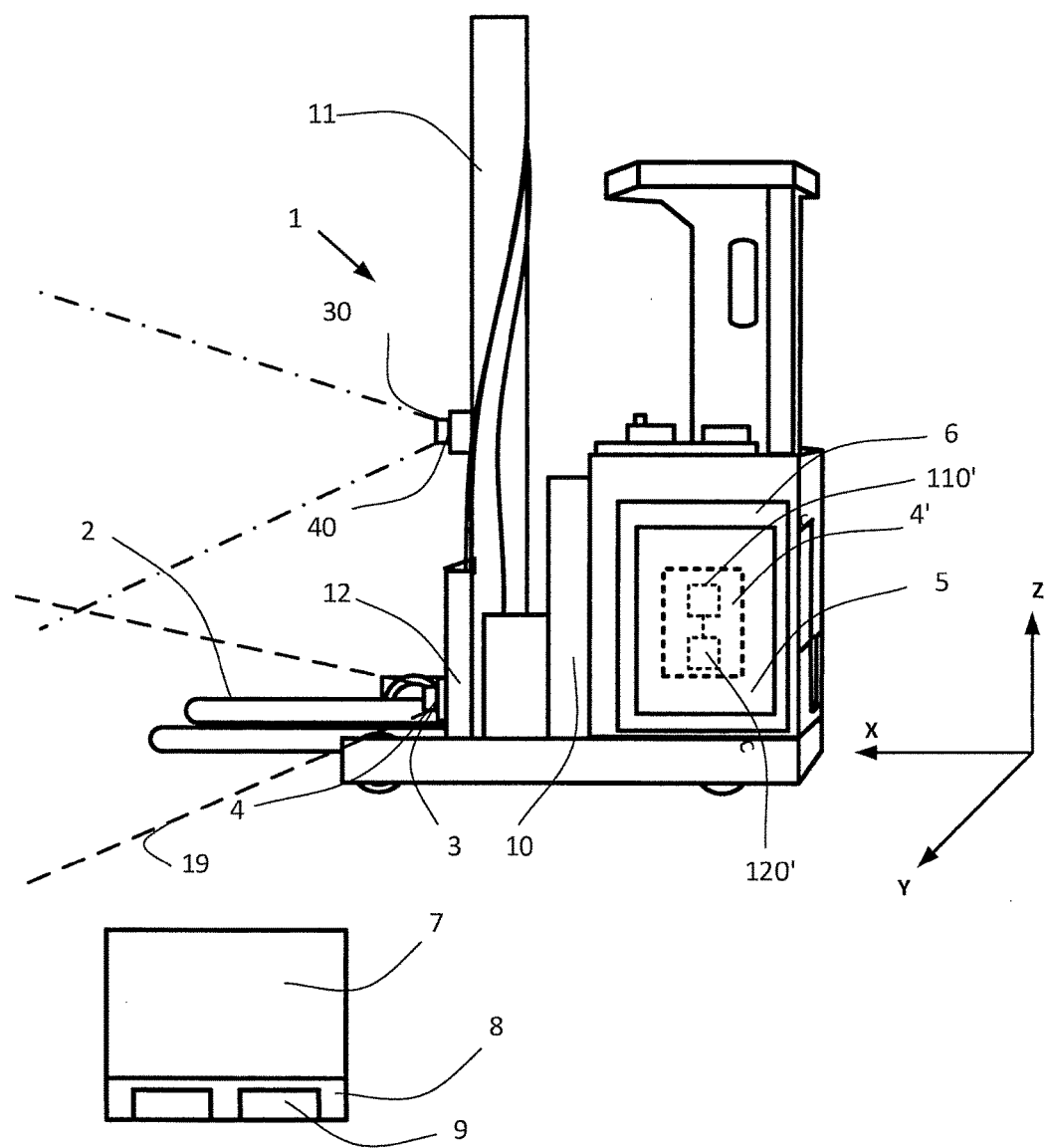
FIG. 1 shows a fork-lift truck according to an embodiment of the present disclosure.

The present disclosure relates to the area of fork-lift trucks 1, such as disclosed in FIG. 1. In particular it relates to fork-lift trucks 1 that are electrical and used within a warehouse. Even more particularly, it relates to fork-lift trucks that are arranged such that they can navigate and move autonomously within a warehouse, for material handling reasons. Still it should be understood that the fork-lift truck 1 can be both autonomous and be manually operated. Also for a manually operated fork-lift truck 1 the disclosure applies. For an autonomous fork-lift truck the warehouse is preferably provided with a general guidance system that makes it possible for the autonomous fork-lift truck to move and navigate for example down to +/−10 cm and, depending on the system used, even down to +/−10 mm of a predetermined position. The system can for example make use of laser guidance or a combination of laser guidance and wire/rail guidance. There are other techniques of guidance and positioning that can be implemented together with the present disclosure, for example SLAM, simultaneous localization and mapping. Further techniques are for example magnets in the floor, or RFID tag technology etc.

The illustrated fork-lift truck 1 includes a load carrier 2. The load carrier 2 comprises in one example only one fork (not shown). In the example of FIG. 1, the load carrier comprises two forks. The load carrier 2 is attached to a lifting mechanism such that the forks can move vertically. The load carrier 2 is also provided with hydraulics such that it can move in the lateral direction of the fork-lift truck 1. The fork-lift truck 1 is in general provided with a mast 11. However the present disclosure is not limited to fork-lift trucks having a mast 11. It is quite conceivable to apply the disclosure to a fork-lift truck 1 that is a low lifting truck, for example a low lifting tiller arm truck, not having a mast. The fork-lift truck 1 comprises a fork-lift truck body 10. The fork-lift truck body 10 is defined as remaining part of the fork-lift truck 1 when the load carrier 2 and an optional mast 11 are removed. The fork-lift truck 1 in general also comprises a drive motor that is used for driving a drive wheel and thus moving the fork-lift truck 1 in a desired direction. The fork-lift truck 1 further comprises a motor for driving a hydraulic pump; hereinafter we call this motor the pump motor. The hydraulic pump pressurises a hydraulic system of the fork-lift truck 1. The hydraulic system of the fork-lift truck 1 is used for the hydraulic functions of the truck in a manner known to a person skilled in the art. Examples of functions that are handled by the hydraulic system are lifting of the load carrier 2, side shift of the load carrier 2, and longitudinal movement of the mast 11 if the fork-lift truck 1 is a reach truck, and tilting of the load carrier 2 in the longitudinal direction. In another example side shift of the load carrier 2 and/or tilting of the load carrier 2 are performed by electrical motors. The drive motor and the pump motor are for the discussed type of fork-lift trucks electrically powered by an energy source. The energy source is in general a suitable rechargeable battery. However, it should be understood that the present disclosure can be used with any type of fork-lift truck that mostly travels within a warehouse. If the disclosure is to be used on other industrial vehicles comprising load carriers in the form of forks, modifications can be needed as the surroundings alters, and differences in design of their respective lifting mechanisms. However, the use of what is written in this disclosure in other industrial vehicles comprising load carriers is also part of this invention.

The fork-lift truck 1 is provided with two optical detectors 3, 30. These optical detectors are herein referred to as first optical detector 3 and second optical detector 30. The first optical detector 3 comprises preferably a 3D-camera. The second optical detector comprises preferably a 3D-camera. With the expression 3D-camera is meant a camera that can provide an output that makes it possible to assess the position of coordinates in a volume with x, y, and z coordinates. 3D stands for three-dimensions. The camera is preferably provided with illumination possibilities such that if the surroundings are dark the camera itself can achieve a sufficient lighting for providing a correct output. As an example a 3D-camera can work on the so-called time-of-flight (TOF) principle, which is known in the art. The optical detectors 3, 30 have in one example an angle of view that is in the range of 20° to 180°, preferably 35° to 70°. The 3D-camera should not be confused with a stereo camera having two lenses. The 3D-camera has in general only one lens and uses digital technology to analyse the received optical data and is in general provided with an optical analysing unit 4, 40, 4' to provide said coordinates x, y, z of objects that are detected through the single lens. The first optical detector 3 is movable with the load carrier 2. In the example illustrated in FIG. 1 the first optical detector 3 on a fork-lift truck 1 with a mast 11 is positioned at the back of a load carrier sledge 12. The load carrier sledge 12 is movable together with the load carrier 2, in the height direction. Alternatively, the first optical detector 3 is positioned adjacent to the back of the load carrier sledge 12. Thus the first optical detector 3 is movable with the load carrier 2. The first optical detector 3 has a first field of view. In the example of FIG. 1 the limits of this first field of view are indicated by dashed lines 19.

The first optical detector 3 is positioned at a first position in relation to the load carrier 2, such that the first field of view, if the load carrier 2 is empty, includes at least a part of the load carrier 2. Further, the first field of view includes an extension of the load carrier 2 so that one or more potential objects 7, 8 positioned within a predetermined distance from the load carrier 2 in the direction of the extension of the load carrier 2 can be detected. This means for example that one or more objects in front of the load carrier 2 can be detected by the first optical detector 3 if the load carrier 2 is empty. By having both the load carrier 2 and a potential object in the first field of view, the fork-lift truck 1 can determine a three-dimensional position of the load carrier 2 and of the potential object. The three-dimensional positions are preferably calculated in a relative coordinate system. This can be done with the help of the at least one optical analysing unit 4, 4' which will be described later. When having the two three-dimensional positions it is then possible to determine a three-dimensional relative position between the load carrier 2 and the potential object. In one example the at least one optical analysing unit is arranged to determine a three-dimensional relative position between the load carrier 2 and the potential object based on the received information from the first optical detector 3.

It is thus not a requirement that the first optical detector 3 is calibrated in position and orientation in relation to the fork-lift truck 1 or a part of the fork-lift truck 1, such as the load carrier 2. Should the detector be slightly distorted as can easily happen due to, for example, getting in contact with a load, being shaken by vibrations of the truck, or the like, this will not affect the functioning of the detector as long as both at least a part of the load carrier 2 and an extension of the load carrier 2 remains in its first field of view. In the example of FIG. 1 the term extension refers to the space in front of the load carrier 2, i.e. the space which has similar y-coordinates like the load carrier 2 in the drawn coordinate system and higher values of its x-coordinate in the drawn coordinate system than the load carrier 2.

The predetermined distance from the load carrier 2 in the direction of the extension of the load carrier 2 within which one or more potential objects 7, 8 are detected can in one example be adjusted depending on the requirements. In general, TOF-cameras have a maximum distance in which they can unambiguously determine the distance of a pixel in the camera. Usually it is enough to restrict the predetermined distance to a few meters in front of the load carrier, or, for some tasks, even below this, for being able to perform the methods which will be described later.

Figure 2:
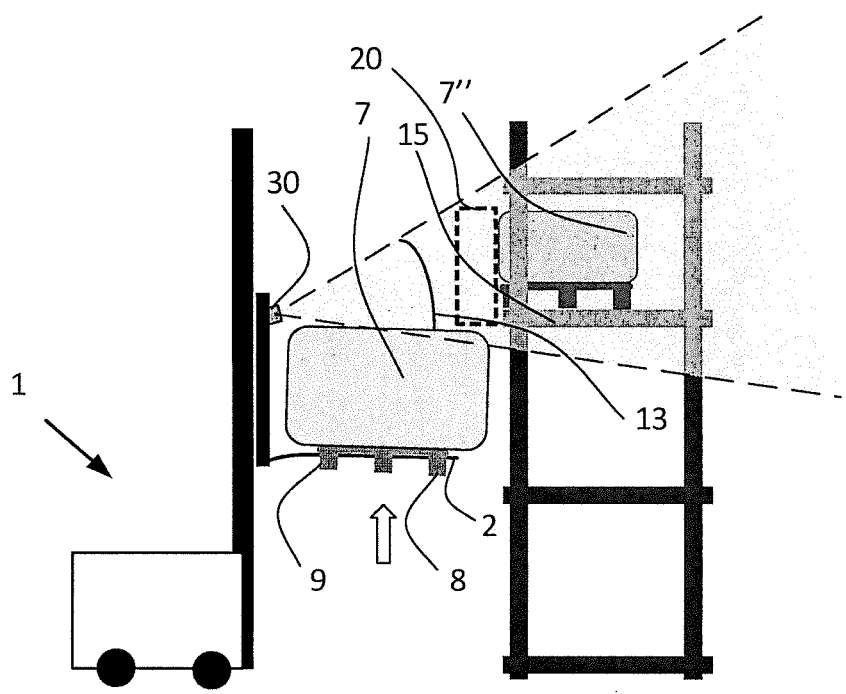
FIG. 2 shows a situation where a fork-lift truck according to the present disclosure is used.
Figure 3:
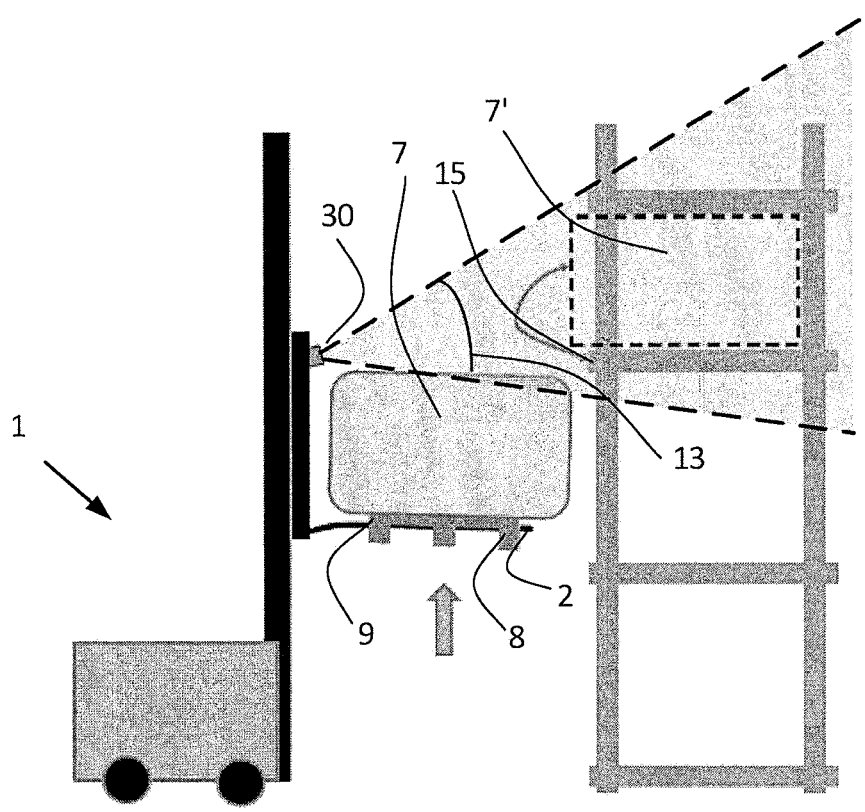
FIG. 3 shows another situation where a fork-lift truck according to the present disclosure is used.

The second optical detector 30 has a field of view which will be denoted second field of view. The limits of this second field of view are indicated by the dash-dotted line in FIG. 1. The second optical detector 30 is movable together with the load carrier 2. In one example the second optical detector 30 is mounted on a fork carriage, for example the load carrier sledge 12, preferably at a predetermined height above the first optical detector 3, such as indicated in FIG. 1. In one example the first and/or second detector 3, 30 is/are mounted on a fork yoke (not shown in the figure). This is preferred if the fork-lift truck allows side-shift of the load carrier 2, since a fork yoke does follow the side-shift whereas the load carrier sledge 12 does not. In one example, the second optical detector 30 is positioned at a predetermined, second position and/or with a predetermined, second orientation in relation to the load carrier 2. In one example, the second optical detector is positioned in relation to the load carrier such that if the load carrier 2 is lifted by a certain distance, the second detector 30 will be lifted with the same distance, thus keeping the relative predetermined position between second optical detector 30 and load carrier 2. The second optical detector is positioned at the second position in such a way that the second field of view includes, if the load carrier 2 is loaded, a predetermined volume above the load 7, 8 so that potential objects positioned within the predetermined volume can be detected. In one example, the predetermined volume comprises a volume which is directly above the load 7, 8, i.e. a volume which is in the vertical extension above the load 7, 8. In one example, the predetermined volume comprises a volume which is not directly above the load 7, 8, i.e. a volume which is not in the vertical extension above the load 7, 8. This could for example be a volume which is above the load 7, 8, i.e. on a "higher level" than the load 7, 8, but which is also longitudinally shifted in relation to the load, so that the volume, when moved in the vertical direction to the level of the load, would be "in front" of the load, i.e. in a longitudinal extension of the load. Examples can be seen in FIGS. 2 and 3. In FIG. 2 a predetermined volume 20 comprises a volume which is directly above the load 7, 8. In FIG. 3 a predetermined volume 7' comprises a volume which is above the load 7, 8, but also longitudinally shifted in relation to the load.

The second position and second orientation, i.e. the position and orientation of the second optical detector 30 is calibrated in relation to a predetermined position on the fork-lift truck 1, preferably a position on the load carrier 2. This is done in such a way that, in case one or more objects are positioned in the predetermined volume, at least one three-dimensional relative position can be determined by the at least one optical analysing unit 4, 40, 4' between, on one side, the load 7, 8 and/or load carrier 2, and, on the other side, the one or more objects positioned in the predetermined volume.

In one example the calibration of the second optical detector 30 is achieved by assuring that the position of the second optical detector 30 is defined by coordinates in three dimensions and the orientation of the second optical detector 30 is defined by at least one angle of orientation in relation to the predetermined position on the fork-lift truck 1. The coordinates in three dimensions are related to the fork-lift truck in general and the load carrier 2 in particular. The reason for this is for the at least one optical analysing unit 4, 40, 4' to know where the objects to be analysed is positioned in relation to the fork-lift truck in general and the load carrier 2 in particular.

The at least one optical analysing unit 4, 40, 4' is arranged to receive and to analyse information from the first optical detector 3. The at least one optical analysing unit 4, 40, 4' is also arranged to receive and to analyse information from the second optical detector 30. In one example the at least one optical analysing unit 4, 40, 4' comprises an optical analysing unit 4 arranged at the first optical detector and an optical analysing unit 40 arranged at the second optical detector 30. In another example (not shown in FIG. 1) the at least one optical analysing unit is arranged in such a way that a common analysing unit is used for the first and the second optical detector 3, 30. The at least one optical analysing unit 4, 40, 4' can assess the position of objects in the field of view of the first optical detector 3. The at least one optical analysing unit 4, 40, 4' can also assess the position of objects in the field of view of the second optical detector 30.

In one example a load carrier control unit 5 controls the hydraulics system of the fork-lift truck 1. The load carrier control unit 5 is also arranged to be able to control a drive motor for a movement of the load carrier 2 in particular in a longitudinal direction of the fork-lift truck 1. The load carrier control unit 5 also controls in one example other functions for altering position of the load carrier 2, such as controlling a reach function of a fork-lift truck 1 that comprises such a function, the lift function, the side shift function etc. The load carrier control unit 5 can be fully integrated into a main control unit (MCU) 6 of the fork-lift truck 1. This provides for a simple solution and provides for less hardware needed on the fork-lift truck 1. The load carrier control unit 5 can also be an independent control unit 5 (not shown in the figure). This will make service of the load carrier control unit 5 simpler and will make upgrades of it easier to perform. In one example the load carrier control unit 5 is positioned close to the load carrier 2, for example close to a load carrier sledge 12. This has the advantage that the load carrier control unit 5 can act as an interface which on one side collects all information and data regarding the load carrier 2 and provides these data to the MCU 6, for example via a so called controller area network (CAN) bus. This collected information and data can for example originate from the elements 4, 4', 3, and 30. On the other hand the load carrier control unit could then receive instructions from the MCU 6, for example via the CAN-bus, about how the load carrier 2 should be operated. These instructions could for example comprise a change of position of the load carrier 2 in relation to the truck body 10, such as an instruction to lift the load carrier 2. However, it should be understood that the placement of the load carrier control unit 5 for taking advantage of this disclosure is not limited to any of the above named places on the fork-lift truck 1.

The optical analysing unit 4' can be part of a load carrier control unit 5 or/and a master control unit 6 of a fork-lift truck 1, as can be seen in FIG. 1 with reference number 4'. This provides for a particular simple and cost effective solution. The optical analysing unit can be an individual hardware that is not part of any other control unit of the fork-lift truck 1. The latter arrangement provides for that maintenance of the optical analysing unit is simplified. In a preferred embodiment the at least one optical analysing unit 4, 40 is integrated in the first optical detector 3 and/or the second optical detector 30. This is particularly advantageous as the raw output of the optical detector 3, 30 does not need to be linked far through the optional mast 11 of the fork-lift truck 1. Thus this at least one optical analysing unit 4, 40 integrated into the optical detector(s) 3, 30 means that transfer of the output over a distance is not needed and thus problems with wiring and also problem of transfer of large image files is avoided.

In an example when the fork-lift truck comprises the load carrier control unit 5, the at least one optical analysing unit 4, 40, 4' can be arranged to transfer information relating to the determined at least one three-dimensional relative position to the load carrier control unit 5. The load carrier control unit 5 can then be arranged to process the transferred information and to adjust at least one of position, orientation and movement of the load carrier 2 based on the transferred information. The adjustment of the position and/or movement of the load carrier 2 can then be performed by the load carrier control unit 5 in at least one, and preferably in three dimensions. In one example an adjustment is performed to avoid a crash between the load or a part of the truck, for example the load carrier, and another object. This can for example be done during a lifting procedure, during a procedure to pick up a load, or during a procedure to deposit a load. How this is performed in detail will be described below.

For an autonomous fork-lift truck 1 the load carrier control unit 5 is in one example arranged to automatically perform the adjustment of the load carrier 2. For a manually operated fork-lift truck 1 suggestions how to adjust the load carrier 2 of the fork-lift truck 1 can be presented to an operator of the fork-lift truck, for example on a display.

We will now describe an example of how a load can be picked up by the fork-lift truck 1. It should be understood that this example is only chosen to illustrate how the truck can be operated and not to explain limiting features of the claims. The fork-lift truck 1 positions itself within a vicinity of the load 7. The optical detector 3 is either on, or is turned on by the optical analysing unit 4, 4'. The optical analysing unit 4, 4' starts receiving an output from the first optical detector 3. The optical analysing unit 4, 4' is arranged to process the received output. The optical analysing unit 4, 4' applies an algorithm to first detect a first three-dimensional object, the load carrier 2. The optical analysing unit 4, 4' preferably starts searching for the load carrier 2 within a predetermined volume. This volume is preferably set not to extend further than the length of the load carrier 2 of the fork-lift truck 1. Within said volume the optical analysing unit 4, 4' uses the output to identify the load carrier 2 of the fork-lift truck 1. As the load carrier 2 is identified, the optical analysing unit 4, 4' continues to evaluate the output, wherein it searches in a second predetermined volume for a three-dimensional object. It should be understood that this three-dimensional object is not the already identified load carrier 2. Preferably the optical analysing unit 4, 4' searches for a pallet tunnel 9 of a pallet 8. The optical analysing unit 4, 4' can also or instead search for a corner or edge of the load 7. When the optical analysing unit 4, 4' has detected said pallet tunnel 9 and/or said corner or edge, the optical analysing unit 4, 4' performs an assessment of the position of the load carrier 2 relative to the detected three-dimensional object, by said optical analysing unit 4, 4'. The position is preferably described as a three-dimensional coordinate, X, Y, Z. When this is performed a determination, for example by calculation, is made to determine the difference between the assessed position of the load carrier and the assessed position of the three-dimensional object. The optical analysing unit 4, 4' calculates a vector in space that essentially describes the repositioning needed to move the load carrier 2 such that it can lift the load 7.

If the three-dimensional object is the pallet tunnel 9, defined by the walls of the pallet tunnel 9 and the surface the pallet 8 is resting on, the load carrier's 2 predetermined position to be achieved is in front of the pallet tunnel 9. The optical analysing unit 4, 4' thereafter sends a control command to the load carrier control unit 5. The load carrier control unit 5 can then reposition the load carrier 2 such that it first is positioned in front of the pallet tunnel 9. Then the load carrier control unit 5 can control the drive motor of the fork-lift truck 1 and move it forward such that the load carrier 2 enters the pallet tunnel 9. The load carrier control unit 5 can control valves and the pump motor and lift the pallet by means of the said load carrier 2. The above described function is of course applicable when using an edge or a corner of a load for performing the function. In this case, the optical analysing unit 4, 4' performs the calculation based on a predetermined position of the edge and corner and a known distance/position of the pallet tunnel 9.

It should be understood that the above functioning of the fork-lift truck 1 can be performed both from floor and from a pallet rack in a ware house, or at any position. The only demand is that the load carrier 2 and the three-dimensional object is within the first field of view within the predetermined distance from the load carrier 2 in the direction of the extension of the load carrier 2, and/or within the second predetermined field of view.

It is also possible to apply the present disclosure to any fork-lift truck 1 where a precise guiding is needed of the load carrier. For example a manually operated reach fork-lift truck can use the presented technology. It is of course a particular advantage to use the technology in a narrow isle fork-lift truck, in particular where the operator is operating from a man down position, with swivel forks. That is the operator is not manoeuvring from a cabin that is moving up and down with the load carrier. The swivel forks that can pick up loads in a 180 degree range by rotating the forks horizontally in front of the driver, thus it is particularly delicate to position such forks properly for picking up a load 7.

Figure 5:
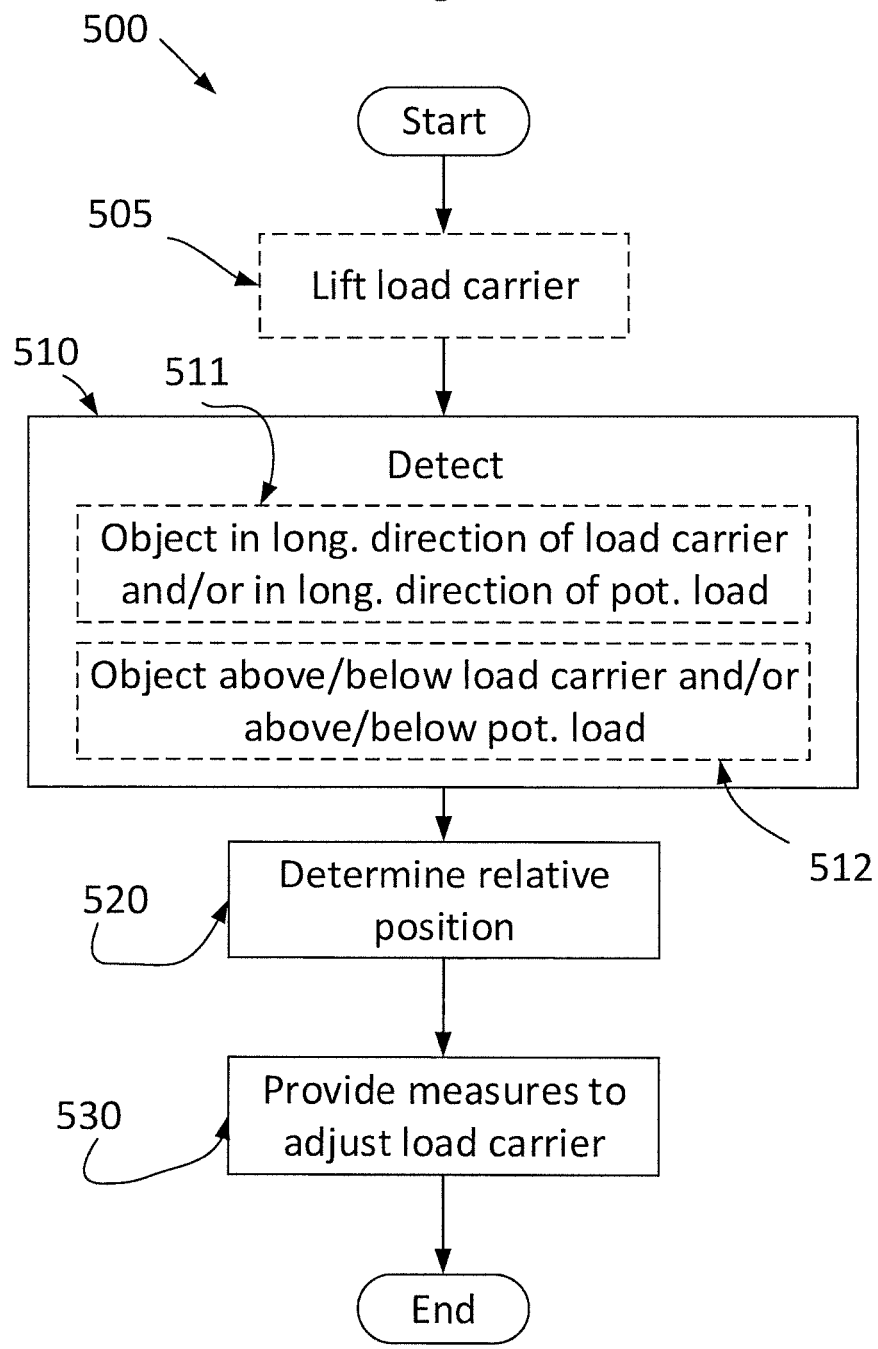
FIG. 5 shows a method according to the present disclosure.

Turning now to FIG. 5 a flowchart over a method 500 for operating a fork-lift truck 1 is presented. In general a step 510 is performed after the start of the method. In step 510 the first and/or second optical detector 3, 30 is detecting at least one object in the longitudinal direction of the load carrier 2 and/or in the longitudinal direction of a potential load 7, 8 on the load carrier (2), as indicated by step 511. Alternatively, or additionally, the first and/or second optical detector 3, 30 is detecting at least one object above or below the load carrier 2 and/or above or below a potential load, as indicated by step 512. Detecting the at least one object is in one example performed within a predetermined volume. The predetermined volume does not have to be a connected volume. Instead, the predetermined volume can in one example comprise a first predetermined volume for the first optical detector 3 and a second predetermined volume for the second optical detector 30. The first and second predetermined volume can intersect in one example. In another example they do not intersect. In one example size and position of the predetermined volume is chosen based on the dimensions of a load 7, 8 on the load carrier 2 in case such a load 7, 8 is present, In one example size and position of the predetermined volume is chosen based on a predetermined pallet size to be handled and/or a height of a load of a predetermined size to be handled in case no load is present on the load carrier 2. Further information about how the predetermined volume can be chosen for an advantageous implementation of the present disclosure will be given later, especially in relation to FIG. 2 and FIG. 3. In one example detecting at least one object comprises transferring an output from the first and/or second optical detector 3, 30 to the at least one optical analysing unit 4, 40, 4', where the at least one optical analysing unit processes the received output to identify the at least one object. This is described in more detail in relation to FIG. 1. The method continues with step 520.

In step 520 at least one three-dimensional relative position between, on one side, the determined at least one object and, on the other side, the load carrier 2 and/or the potential load 7, 8 is determined. This determination is preferably done by the analysing unit 4, 40, 4'. The method continues with step 530.

In step 530 measures are provided to adjust at least one of a position, an orientation and a movement of the load carrier 2 based on the determined three-dimensional relative position. In one example these measures are provided by the load carrier control unit 5. An adjustment can, for example, be to change the position and/or orientation of the load carrier 2. Another example of an adjustment is to stop a movement of the load carrier 2. In one example, the term adjustment comprises also to keep the current position and/or orientation and/or movement of the load carrier 2. The method finishes after step 530.

In the following we will describe some tasks which can be performed by the method 500 of operating a fork-lift truck.

In one example the method 500 of operating a fork-lift truck can be used to avoid a crash between the fork-lift truck 1, or at least a part thereof, and potential other objects when lifting the load carrier 2. These potential other objects can for example be a racking, a load on a racking, or a pallet. Although these might be the most likely objects in a warehouse with which a truck can potentially crash when lifting its load carrier 2 it should be understood that the method 500 when used for crash avoidance is not limited to these object but can in principle be used to avoid a crash with any possible object which can be detected by the first 3 and/or the second optical detector 30. When using the method 500 of operating a fork-lift truck for crash avoidance while lifting the load carrier 2, the method starts with step 505 of lifting the load carrier 2. The load carrier 2 has in one example a load 7, 8 on it. The method continues then with step 510 as described above.

When the load carrier 2 is empty, in step 510 the first optical detector 3 is used to detect at least one object above the load carrier 2, i.e. step 512. In case a predetermined volume is chosen this predetermined volume is preferably chosen in such a way that it comprises a volume directly above the load carrier 2, especially directly above the front end of the load carrier 2. This is due to the fact that objects which are in the way for a lifting procedure and might cause a crash are most likely objects in a racking which protrude out of the racking or protruding parts of the racking itself. In one example, if the first optical detector 3 is calibrated in relation to the load carrier 2, it can then in step 520 be determined the relative position between the detected object and the load carrier. In case the first optical detector 3 is not calibrated in relation to the load carrier 2, it has to be assured that the load carrier 2 is in the field of view of the first optical detector 3. This allows as well a determination of the relative position between the object and the load carrier 2. After determining the three-dimensional relative position between the detected object and the load carrier 2 it can be determined whether the detected object is protruding in the lifting path of the load carrier 2. In one example the at least one optical analysing unit 4, 40, 4' can perform the step of determining whether the object is protruding in the lifting path. In case at least one object is detected above the load carrier 2 by the first optical detector 3, and that at least one of the detected at least one object protrudes in the lifting path of the load carrier 2, measures are provided to avoid collision between the at least one object and the load carrier 2. This is preferably performed in step 530. In one example the measure is to stop the lifting procedure of the load carrier 2. Afterwards, a repositioning of the fork-lift truck 1 can be performed. Alternatively, or additionally, a measure can be to inform an operator of the fork-lift truck 1. In one example this is done by showing a message on a display or by giving an acoustic and/or vibrational signal to the operator.

The method of operating the fork-lift truck for crash avoidance when the load carrier 2 is loaded by a load 7, 8, as is illustrated in FIG. 2, follows, if not otherwise described, the procedure for crash avoidance of an empty load carrier 2. In case the load carrier 2 is loaded by a load 7, 8 the second optical detector 30 is used for crash avoidance. When doing so, in step 510 the second optical detector 30 detects an object above the load 7, 8, i.e. step 512. In case a predetermined volume is used this predetermined volume is preferably positioned in such a way that it comprises a volume directly above the load 7, 8, especially directly above the front end of the load 7, 8. One example of such a predetermined volume 20 is indicated in FIG. 2. The most likely objects to crash with are the same as in the empty case, as can be seen from FIG. 2 as well. In one example, the detected object is a load 7" on the racking. Since the second optical detector 30 is calibrated in relation to the fork-lift truck 1, a relative position between the load carrier 2 and the detected object can be determined in step 520. In one example the second field of view is oriented in such a way that at least part of the load 7, 8 is in the second field of view. In this case a relative position between the detected object and the load 7, 8 can be determined in step 520. Alternatively, a relative position between the determined object and the load 7, 8 can be determined by assuming a size or a maximum size of the load 7, 8 and a position of the load 7, 8 on the load carrier 2. This is a preferred example in case the load is not in the second field of view. However, it should be noted that this method also can be used if the load 7, 8 is in the second field of view. In case at least one object is detected above the load 7, 8 by the second optical detector 30, and that at least one of the detected at least one object protrudes in the lifting path of the load carrier 2 with the load 7, 8, measures are provided to avoid collision between the at least one object and the load carrier 2 with the load 7, 8. These measures are in one example the same as described above in the case for an empty load carrier 2.

In the above when talking about an object it should be understood that the method can be easily adopted in case more than one object is detected and/or present in the lifting path.

We now describe an example about how the method 500 of operating a fork-lift truck can be used to pick up a load 7, 8. It is assumed that the fork-lift truck 1 is in front of a racking where the load 7, 8 should be picked up. The method starts with step 505 by lifting the load carrier 2 to a predetermined position where a load 7, 8 is expected. During this lifting procedure the method 500 can be performed for avoiding a crash as described above. The predetermined position can for example be a specific shelf of the racking. The method then continues with step 510. In connection with step 510 the load 7, 8, preferably potential pallet tunnels 9 of that load, is determined among the detected at least one object. For assuring that, the load has to be in the field of view of the first and/or second optical detector 3, 30. Since the load carrier 2 is lifted to the predetermined position where the load to pick up is expected, a potential predetermined volume, in which the step of detecting the at least one object is performed, comprises a volume in the longitudinal direction of the load carrier 2. Preferable the first optical detector 3 can be used to detect pallet tunnels 9. This is, however, not a prerequisite. The process of determining the load 7, 8 to pick up among the detected at least one object is in one example by the at least one optical analysing unit 4, 40, 4'. Pallet tunnels 9 have often a predetermined size. In one example, the at least one optical analysing unit 4, 40, 4' is therefore arranged to perform an image recognition process to determine the pallet tunnels 9. Image recognition processes are known in the art and therefore not described any further here.

In connection with step 520 it is then assured that the determined at least one three-dimensional relative position comprises at least one three-dimensional relative position between the load 7, 8 to pick up and the load carrier 2, preferably at least one three-dimensional relative position between potential pallet tunnels 9 of the load and the load carrier 2. By doing so it can be determined how the fork-lift truck 1, especially the load carrier 2 of the fork-lift truck 1 is oriented in relation to the load 7, 8, especially the pallet tunnels 9 of the load.

In connection with step 530 measures are then provided to adjust at least one of a position and an orientation of the load carrier 2 based on the determined three-dimensional relative position. These measures are provided in such a way that the load carrier 2 is positioned in a pick-up position in front of the load 7, 8 to pick up, such that a compensation for racking misalignment and/or deflection, floor misalignment, and mast inclination and/or deflection is achieved. In one example, the pick-up position is a position where the load carrier 2 is positioned and oriented so that the pallet tunnels 9 of the load 7, 8 are in the direct longitudinal extension of the forks of the load carrier 2, and so that the pallet tunnels 9 have the same orientation as the forks of the load carrier 2. The provided measures comprise in one example moving the load carrier 2 up or down, and/or moving the load carrier 2 sideways.

After the above the method has an additional step of loading the load on the load carrier 2, preferably by entering the load carrier 2 in the pallet tunnels 9, and picking up the load 7, 8. This step is not shown in FIG. 5. In one example this is performed automatically by an autonomous fork-lift truck. In one example, this comprises one or more of the steps moving forward the truck, lifting the load carrier 2 so that the load 7, 8 is lifted slightly by the load carrier, moving the truck backwards. In one example of a manually operated fork-lift truck the driver gets indications on a display of what to perform of one or more of the above named sub-steps. After picking up the load 7, 8 the method ends.

An advantage of the method is that it is not important to analyse what kind of misalignment or deflection there might be present. With the present method it is enough to detect that there is some kind of misalignment and/or deflection, and then to correct it by the provided measures. By using the herein described method, it can be avoided that load carrier 2 engages with the load in a "wrong" way, i.e., for example, a way in which the load carrier would hit the pallet 8 or the load 7 on the pallet 8 instead of entering the pallet tunnel 9, which would risk that the load carrier 2 pushes the pallet 8 and/or the load 7 in such a way that it could damage adjacent objects like other loads on the racking or the racking itself, or, even fall down on the backside of the racking. Thus, the herein described method can increase safety and reduce damages, especially when used in combination with automatically operated trucks or with trucks where an operator does not have a good direct view on the load carrier and the pallet.

Figure 4:
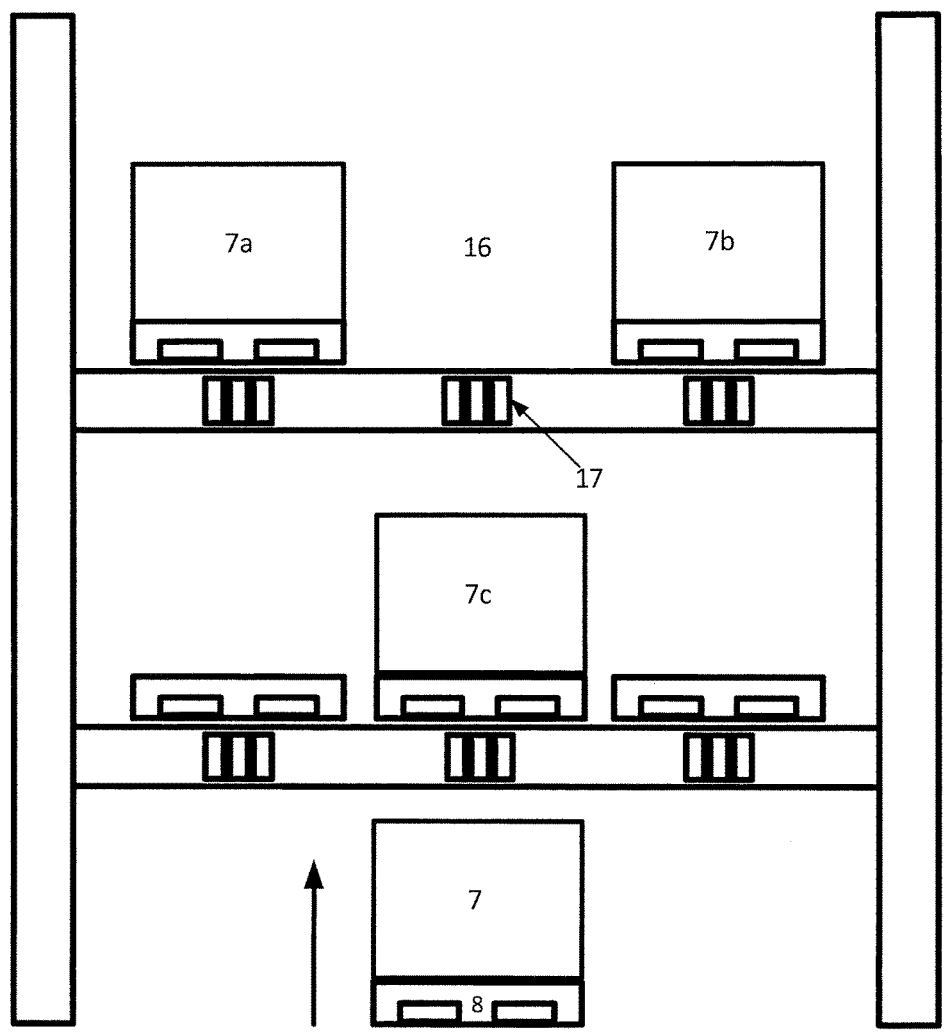
FIG. 4 shows yet another situation where a fork-lift truck according to the present disclosure is used.

In the following it will be described how method 500 of operating a fork-lift truck can be used to deposit a load. This will be explained with reference to FIG. 4. In this example, it is assumed that the load is to be deposited at the place denoted by number 16. Sideways of the place 16 where the load should be deposited there are other objects 7a and 7b, respectively, positioned. Below, yet another object 7c is positioned. The method 500 when used for depositing a load starts with a step 505 of lifting the load carrier 2 to a predetermined position, where it is assumed that the second optical detector 30 can detect whether there are any protruding objects in a volume where the load 7, 8 is to be deposited. In the example of FIG. 4 this volume would comprise, at least partly, the position 16 where the load 7, 8 is to be deposit. Another example, on a side view, is shown in FIG. 3, where the volume could be the volume denoted by 7', when it is assumed that the load is to be deposited on the third shelf in the racking. FIG. 3 is not on scale it has to be understood that the place in the racking of course has to be big enough to actually physically allow a depositing of the load 7, 8. The protruding objects can for example be objects 7a, 7b or parts of the racking itself. As can be seen from FIG. 3, the predetermined position can be a position which does not allow depositing the load directly by moving the load carrier forward. Instead, this predetermined position will in general be a position which places the load carrier 2 at a lower position than where the height on which the load is to be deposited. This is due to the fact that the load 7, 8 otherwise might block the view for the second optical detector 30 on the predetermined volume 7' at the place 16 where the load should be deposited. The lifting procedure can be performed automatically by an autonomous fork-lift truck 1, for example via a load carrier control unit 5. An operator of a manually driven fork-lift truck can, for example, instead use a height pre-selection. By giving a specific input command, for example a specific height or a specific level of shelf in case the shelves have predetermined heights which are stored in the truck, the operator can then give cause to an automatic lifting of the load carrier 2 according to the input command. In case the load should be deposited on a low shelf in a racking it might in principle happen that no lifting is required to bring the second optical detector 30 in the position as described above. It should therefore be understood that the lifting is only performed if necessary to reach the predetermined position.

In connection with step 510 a predetermined object with a predetermined relation to the racking and to the predetermined volume where the load 7, 8 is to be deposited is determined among the detected at least one object. This predetermined object is in one example one of a side of a racking and/or a landmark. A landmark 17 is for example a sign which has a specific predetermined relation to the place 16 where the load should be deposited. It is known in the art how to use landmarks to mark places on a racking where load can be stored, deposited or picked up. Therefore, this is not described here any further. In case no landmark is present, or additionally to a landmark, at least one side of a racking can be determined. Especially if there are only one or two positions for loads on a shelf on a racking, a side of the racking can be determined.

In connection with step 520 the method is assuring that the determined at least one three-dimensional relative position comprises at least one three-dimensional relative position between the load carrier 2 and the predetermined object with the predetermined relation to the racking and to the volume. By doing so, it is determined how the load carrier 2 is positioned in relation to the position 16 where the load should be deposited.

Then, in connection with step 530, measures are provided to adjust at least one of a position, and an orientation of the load carrier 2 based on the determined three-dimensional relative position. These measures are provided in such a way that a compensation for racking misalignment and/or deflection, floor misalignment, and mast inclination and/or deflection is achieved and such that the second optical detector 30 can detect whether there are any protruding objects in the volume where the load 7, 8 is to be deposited.

The method continues then with another step (not in FIG. 4) of detecting by the second optical detector 30 whether there are any protruding objects in the volume where the load 7, 8 is to be deposited. The output of the second optical detector 30 is then preferably analysed by the at least one analysing unit 40, 4' to conclude whether there is any such protruding object. If any such protruding object is found the method preferably stops the process of depositing the load.

In case no protruding objects have been found in the volume where the load 7, 8 is to be deposited, the method continues by positioning the load carrier 2 in a position where the load 7, 8 can be deposited and then deposits the load 7, 8 into the racking. In one example this is performed automatically by an autonomous fork-lift truck. In one example, this comprises one or more of the steps lifting the load carrier to a height slightly above the height of the shelf on the racking on which the load is to be deposited, moving forward the truck so that the load 7, 8 on the load carrier is situated over the shelf on which the load is to be deposited, lowering the load carrier 2 so that the pallet 8 stands on the shelf and not the load carrier 2 any longer, moving the truck backwards so that the load 7, 8 no longer is in a vertical extension of the load carrier 2. In one example of a manually operated truck the driver gets indications on a display of what to perform of one or more of the above named sub-steps.

In one example the step of retracting the load carrier 2 from the load 7, 8 is performed after the load 7, 8 has been deposited, where it is understood that the step of moving the truck backwards is not comprised in the step of depositing the load 7, 8. Then, after the load carrier 2 has been retracted by at least a predetermined distance from the load 7, 8, the load 7, 8, preferably a potential pallet 8 of the load 7, 8, and the racking is detected by the first optical detector 3. Here it is important that the load carrier 2 first is retracted a predetermined distance so that at least parts of the load 7,8 and the racking are in the field of view of the first optical detector. Then, a three-dimensional relative position is determined between the load 7, 8, preferably the potential pallet 8 of the load 7, 8, and the racking. This is in one example done by the at least one analysing unit 4, 40, 4'. By determining the relative position one can assure that the load 7, 8 has been deposited in a desired relation to the racking. This means in one example that the load should stick out a predetermined distance outside of the racking. By doing so one can assure that the load has not been stuck to the load carrier 2. In one example, after assuring that the load 7, 8 is in a desired relation to the racking, the load carrier 2 is retracted completely from the load 7, 8.

In relation of the above description of several examples of method 500 the expression "in connection with step XXX", where XXX denotes a number, has been used. It should be understood that this expression allows performing the described actions either in step XXX or at a separate step following step XXX, but before the next step which has been denoted an own number in the sequence of method 500.

Figure 6:
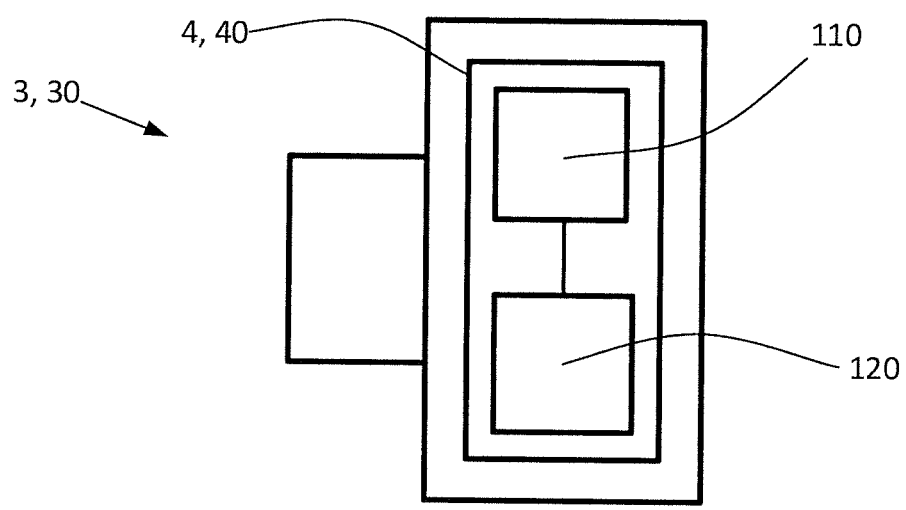
FIG. 6 shows an optical detection unit according to the invention.

Turning now to FIG. 6, a schematic diagram is disclosed illustrating an exemplary embodiment of an optical detector 3. The optical detector 3 comprises a processor 110 and a memory 120, the memory 120 containing instructions executable by the processor 110. The processor 110 is a Central Processing Unit, CPU, microcontroller, Digital Signal Processor, DSP, or any other suitable type of processor capable of executing computer program code. The memory 120 is a Random Access Memory, RAM, a Read Only Memory, ROM, or a persistent storage, e.g. a single or combination of magnetic memory, optical memory, or solid state memory or even remotely mounted memory.

The processor 110 and the memory 120 of the optical analysing unit 4, are here disclosed as being situated in the optical detector 3, but the optical analysing unit 4' with the processor 110' and the memory 120' can also be located in a body of a fork-lift truck 1, see FIG. 1. In another embodiment of the present disclosure, the processor 110 and the memory 120 is an external unit. This means that the fork-lift truck 1 communicates with the processor 110 and the memory 120 by means of a communication device (not shown). This can preferably be a wire-less link. The communication device comprises in this embodiment an antenna.

It should be understood that the above applies to the second optical detector 30 as well.

According to one aspect, the disclosure further relates to a computer program, comprising computer readable code which, when run on the fork-lift truck 1 causes the fork-lift truck 1 to perform any of the aspects of the methods described above.

When the above-mentioned computer program code is run in the processor 110 of the fork-lift truck 1 in the optical analysing unit 4, 40, 4' it causes the fork-lift truck 1 to perform the steps of the disclosed methods.

The invention claimed is:

1. A fork-lift truck comprising:
a load carrier;
a first optical detector having a first field of view;
at least one optical analysing unit receiving and analysing information from the first optical detector; and
a second optical detector having a second field of view,
wherein said at least one optical analysing unit receiving and analysing information from the second optical detector,
wherein said first and second optical detector are movable together with the load carrier and said first optical detector is positioned at a first position in relation to the load carrier, such that the first field of view, if the load carrier is empty, includes at least a part of said load carrier and an extension of the load carrier so that said first optical detector detects one or more potential objects positioned within a predetermined distance from the load carrier in the direction of the extension of the load carrier, wherein said second optical detector is positioned at a second position, such that the second field of view includes, if the load carrier is loaded, a predetermined volume above the load so that said second optical detector detects potential objects positioned within said predetermined volume, and wherein the position and orientation of said second detector is calibrated in relation to a predetermined position on said fork-lift truck, such that, in case one or more objects are positioned in the predetermined volume, at least one three-dimensional relative position can be determined by said at least one optical analysing unit between, on one side, said load and/or load carrier, and, on another side, said one or more objects positioned in the predetermined volume.

2. The fork-lift truck according to claim 1, where said second optical detector is positioned at a predetermined position and/or with a predetermined orientation in relation to the load carrier.

3. The fork-lift truck according to claim 1, where said position of said second optical detector is defined by coordinates in three dimensions and said orientation of said second optical detector is defined by at least one angle of orientation in relation to said predetermined position on said fork-lift truck.

4. The fork-lift truck according to claim 1, where the first and second optical detector comprise a 3D-camera.

5. The fork-lift truck according to claim 1, wherein said one or more objects positioned in the predetermined volume comprise at least one racking, load on a racking, and pallet, and/or where said one or more potential objects positioned within a predetermined distance from the load carrier in the direction of the extension of the load carrier comprise at least one of racking, load on a racking, and pallet.

6. The fork-lift truck according to claim, wherein the fork-lift truck further comprises a load carrier control unit, wherein said at least one optical analysing unit is arranged to transfer information relating to said determined at least one three-dimensional relative position to said load carrier control unit, wherein said load carrier control unit is arranged to process said transferred information and to adjust at least one position, orientation and movement of said load carrier based on said transferred information.

7. The fork-lift truck according to claim 6, wherein said load carrier unit is arranged to perform said adjustment of position and/or movement of said load carrier in at least one-dimension.

8. The fork-lift truck according to claim 6, wherein at least one of said optical detectors is arranged to detect a pallet of an object within said predetermined distance from the load carrier in the direction of the extension of the load carrier and/or in the predetermined volume, preferably also at least one pallet tunnel of said pallet.

9. The fork-lift truck according claim 1, wherein the predetermined volume comprises a first part located directly above the load and/or a second part located in front of the load.

10. The fork-lift truck according to claim 1, wherein said at least one optical analysing unit and/or load carrier control unit is comprised within a master control unit of the fork-lift truck.

* * * * *